M. R. DEYO.
CULVERT.
APPLICATION FILED JUNE 26, 1919.
1,361,027.
Patented Dec. 7, 1920.
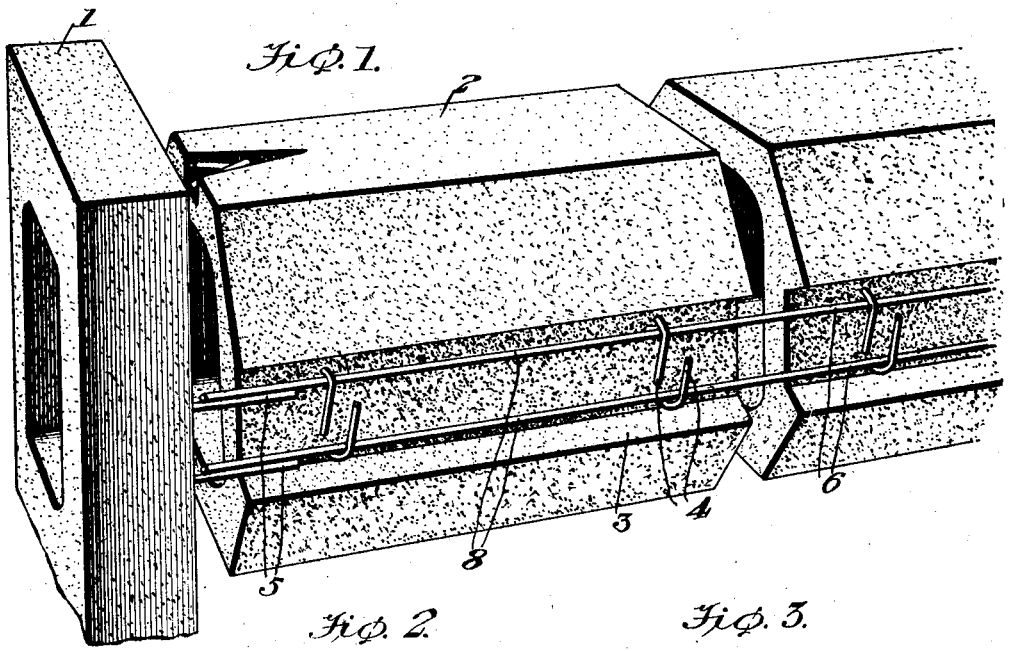
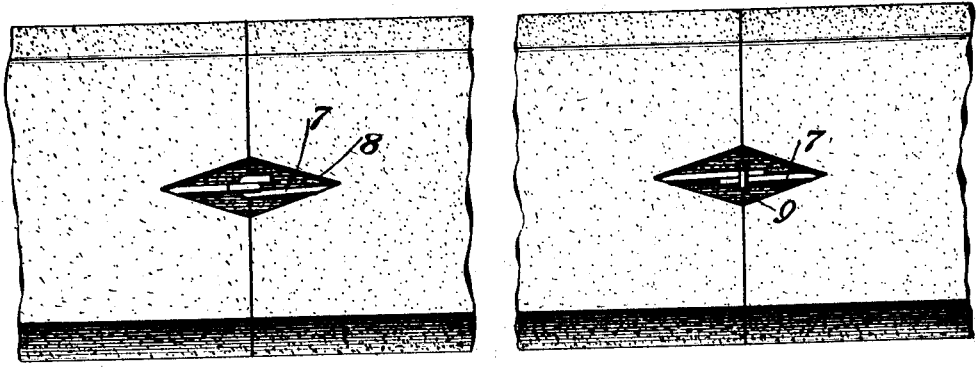
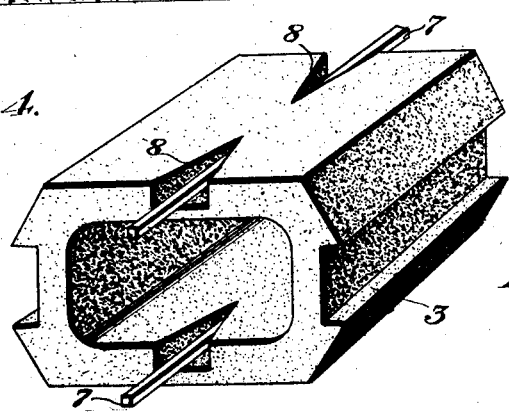
WITNESSES
INVENTOR
M. R. Deyo,
BY
ATTORNEYS

UNITED STATES PATENT OFFICE.

MARK R. DEYO, OF PEORIA, ILLINOIS.

CULVERT.

1,361,027.  Specification of Letters Patent.  Patented Dec. 7, 1920.

Application filed June 26, 1919. Serial No. 306,875.

*To all whom it may concern:*

Be it known that I, MARK R. DEYO, a citizen of the United States, and a resident of Peoria, in the county of Peoria and State of Illinois, have invented certain new and useful Improvements in Culverts, of which the following is a specification.

My invention is an improvement in culverts, and has for its object to provide a culvert composed of hollow tiles formed from plastic material capable of hardening and suitably reinforced, the tiles being placed end to end and having means in connection therewith for permanently locking them together and to the head walls, and wherein a continuous compound reinforcement is provided for the conduit.

In the drawings:

Figure 1 is a perspective view of one end of the improved culvert;

Fig. 2 is a plan view showing one method of connecting the sections;

Fig. 3 is a similar view showing another method;

Fig. 4 is a perspective view of one of the conduits.

In the present embodiment of the invention, the improved culvert is composed of two similar head walls 1 and a suitable number of hollow tiles 2, the said tiles being abutted at their ends and the endmost tiles abutting the head walls.

Each tile is substantially rectangular in cross section and is provided in its opposite side walls and in the outer faces of the said walls with longitudinally extending channels or grooves 3, which are adapted to aline or register in the tiles of the completed culvert to form a channel extending the full length of the culvert, as shown in Fig. 1.

Each tile has arranged within the material thereof reinforcing rods 4, such rods extending transversely of the tile and the ends of the rods extending out into the channels to the opening through the bottoms of the channels near the opposite side walls of the channels, as shown in Fig. 1. The reinforcements are formed by rods which are bent to lie in the top and bottom walls of the tile and to extend approximately half the depth of the side walls and to be then bent outwardly into the channel or groove. Thus a pair of these rods is provided at each end of the tile.

In laying a culvert with the improved tiles, the ditch is first dug and the bottom leveled. The first section has a layer of mortar or cement placed on one end and this end is abutted against one of the head walls 1, said wall having rods 5 extending out into the channels of the sections. Rods 6 are arranged between the head walls and lying in the channel of the culvert, one rod being arranged near the upper side wall and the other near the lower side wall of the channel, and these rods are connected at their ends to the rods 5 in any suitable manner, as, for instance, by clamps or by bending the ends of the rods 5 and 6 together. The ends of the rods 4 are bent angularly to embrace the rods 6, as shown in Fig. 1, and after the conduit is completed the channel is filled with reinforcing material capable of hardening.

Each tile has also arranged in its top and bottom wall a longitudinally extending reinforcing rod 7, and the ends of these rods extend into cut-outs or notches 8 at the ends of the tile, the cut-outs in the upper wall being on the outer surface of the wall while the cut-outs in the lower wall are on the inner surface. These cut-outs, as shown, are fan shaped or triangular, and the ends of the rods extending into the cut-outs and beyond the ends of the tile are adapted to be connected with the rods of adjacent tiles, either in the manner shown in Fig. 2 or in the manner shown in Fig. 3. In Fig. 2 the ends of the rods 7 are hooked, and the hooks are engaged. In Fig. 3 a clip 9 is provided for rigidly securing the ends of the rods 7 together. These notches or cut-outs are, after the connection has been made, filled with mortar, the mortar completely protecting the seal.

I claim:

A culvert construction comprising the combination with the head walls and hollow tiles arranged therebetween and disposed in end to end relation to form a continuous conduit; of longitudinally extending reinforcing rods embedded in the material of the hollow tiles at the tops and bottoms thereof and extending beyond the tiles at the ends thereof, said tiles being cut away at triangular areas on the upper faces of the top and bottom walls at the ends whereby to bare said reinforcing rods, the projecting ends of said reinforcing rods being bent into engagement with one another whereby to provide interengaging hooks securing the tiles in position.

MARK R. DEYO.